Sept. 19, 1944.   H. ZIEBOLZ   2,358,611
MEANS FOR STABILIZING HYDRAULIC CONTROLS
Filed June 5, 1941   2 Sheets-Sheet 1
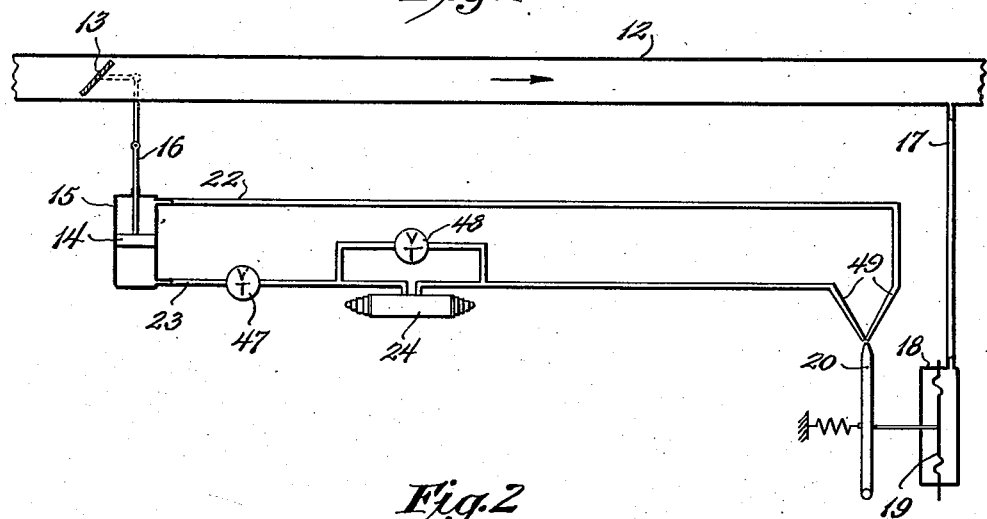
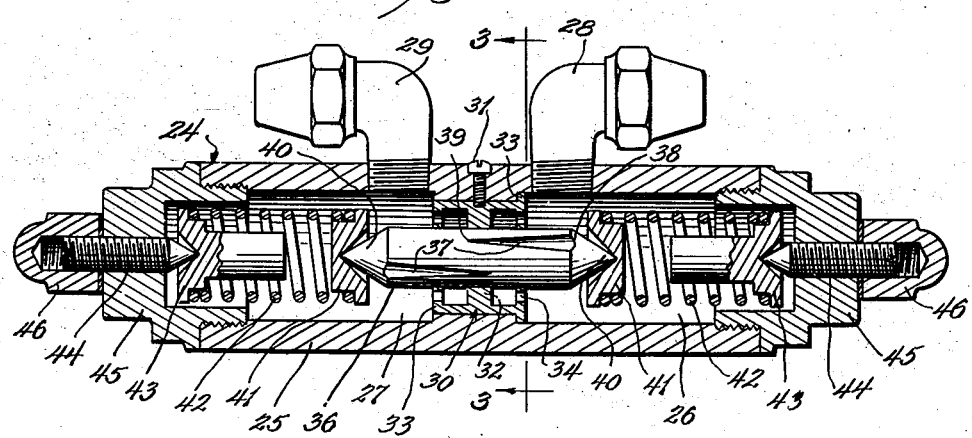
Inventor
H. Ziebolz
By A. D. Adams
Attorney Sept. 19, 1944.   H. ZIEBOLZ   2,358,611
MEANS FOR STABILIZING HYDRAULIC CONTROLS
Filed June 5, 1941   2 Sheets-Sheet 2
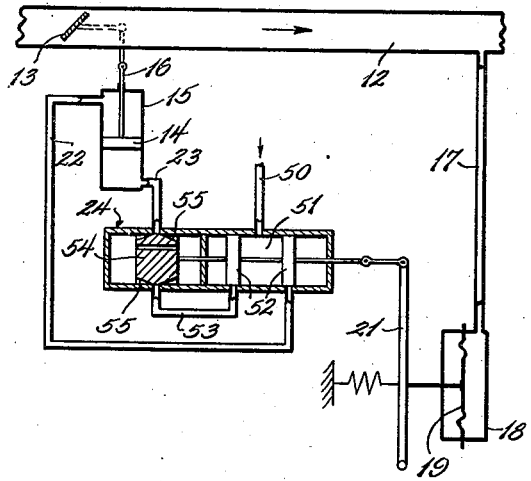
Fig. 5
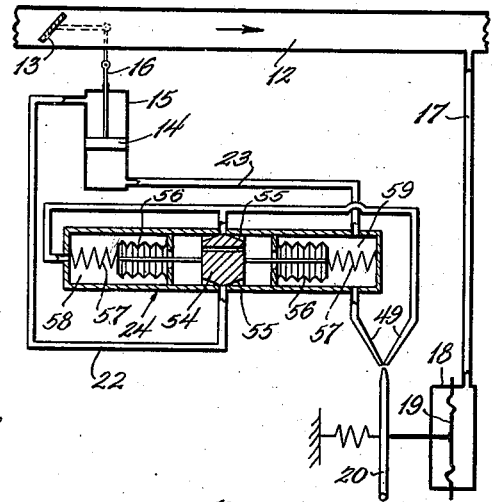
Fig. 6
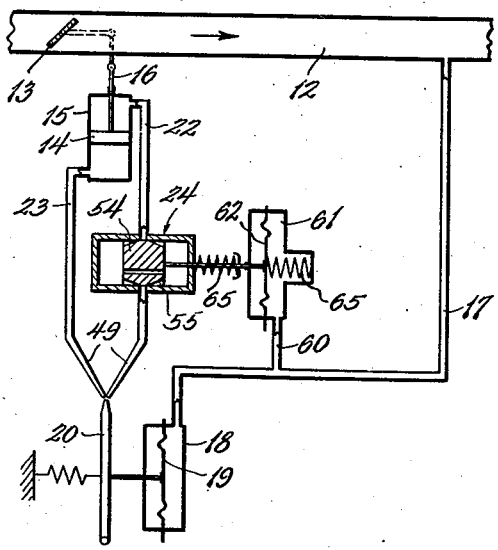
Fig. 7
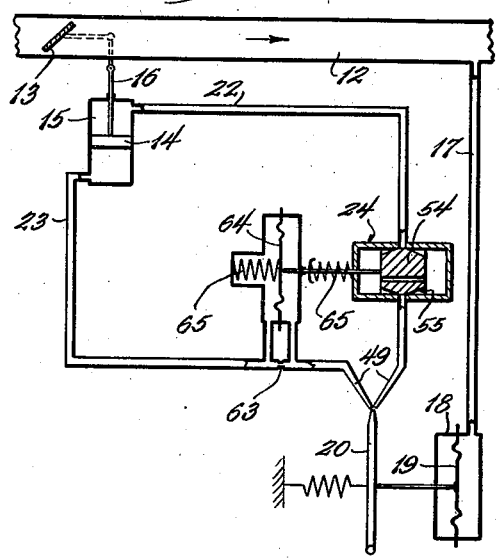
Fig. 8
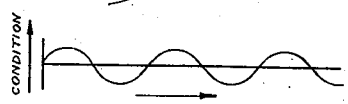
Fig. 9
Fig. 10
Fig. 11
Inventor
H. Ziebolz
By A. D. Adams
Attorney Patented Sept. 19, 1944

2,358,611

UNITED STATES PATENT OFFICE 2,358,611

MEANS FOR STABILIZING HYDRAULIC CONTROLS

Herbert Ziebolz, Chicago, Ill.

Application June 5, 1941, Serial No. 396,772

6 Claims. (Cl. 138—46)

The present invention relates to a modulating valve for hydraulic controls.

The object of the invention is to provide a modulating valve between a controlling fluid relay having definite operating characteristics and a servo-motor which controls a condition in response to changes in a condition. The purpose of the modulating valve is to modify the operating characteristic; that is, the relation between the relay movement and the rate of servo-motor travel in a predetermined manner. One of the principal applications is in the field of fluid pressure operated controls wherein it is desirable or necessary to increase the stability of control by modifying the rate of travel of a servo-motor so that it becomes a definite function of the condition which is controlled.

It is a further object of the invention to provide modulating valve means in a fluid relay system having fluid relay conduits connecting the relay to operate a servo-motor and in which the valve means automatically varies the rate of flow in both directions through the respective conduits to vary the rate of movement of the servo-motor in proportion to changes in the relay position.

Another feature of the invention resides in providing a double-acting modulating valve provided with oppositely disposed, varying restrictions so arranged that they are automatically cleansed by the fluid passing therethrough.

Further aims and advantages of the invention will appear in the specification in connection with the accompanying drawings, wherein:

Fig. 1 is a diagrammatic view illustrating a hydraulic control system with a modulating valve in one of the conduits;

Fig. 2 is a longitudinal sectional view of the modulating valve of Fig. 1;

Fig. 3 is a cross section taken on line 3—3 of Fig. 2 in the direction of the arrows;

Fig. 4 is a diagram showing the cylinder speed curves;

Figs. 5 to 8 are diagrammatic views illustrating a number of modified hydraulic control systems with modified modulating valves; and Figs. 9 to 11 are control charts.

Referring particularly to the drawings, the illustrated embodiments of the invention will be explained as being applied to a fluid operated relay system wherein a servo-motor is employed to control a condition, such as the flow of gas, etc., in response to condition changes, such as changes in pressure, etc.

It is a well known fact that the stability of fluid pressure actuated controls increases with decrease of rate of servo-motor travel. If the control is "hunting," as shown in Fig. 9, it has been customary to decrease the rate of servo-motor travel by capillary tubes or fixed restrictions (needle valves). Capillary tubes have the advantage of decreasing the rate of servo-motor travel directly proportional to condition changes throughout the range of the relay movement. It has, however, the great disadvantage that due to the small openings of the capillary tubes, the danger of clogging is comparatively great and that capillary tubes are very sensitive to changes of viscosity of the fluid. The fixed restriction has the disadvantage that, as shown in Fig. 4, curve C, the effect is very pronounced at higher rates of servo-motor travel. As shown in Fig. 4, comparing curves A and C, assuming that curve A represents the relay characteristic without any restriction, curve C represents the rate of servo-motor travel with a fixed orifice or adjustable valve in one of the control lines. It will be noted that there is practically no change in rate of travel for smaller relay movements, while the resistance increases approximately with the square of the displacement or the rate of servo-motor travel. Such a restriction therefore decreases the control speed when it is most needed and has very little effect in case of small variations or changes in the condition to be controlled. The result usually, therefore, is the one shown in Fig. 10, where a certain improvement is shown, as compared with Fig. 9. However, the stability is not as yet satisfactory. It is evident that it is desirable in many cases to have the rates of servo-motor travel which are small at small relay movements and are great for maximum relay deflections. This is obvious as such relay will give great stability in its neutral position. However, it will permit a fast movement of the servo-motor in casces of sudden changes which may occur. The result of such characteristic as shown in curve B (Fig. 4), is shown in Fig. 11, which shows stable control.

The invention solves the problem by providing a variable restriction in one of the conduits to the servo-motor which changes the resistance to the flow of fluid to the servo-motor as a function of the change of the condition, to produce the desired relay characteristic by the shape of the restriction. In the illustrated embodiments, the design is such as to produce minimum fluid openings for small changes in the condition and thus produce a maximum stability within any desired small range of displacements of the relay. Also, it provides a maximum opening for relatively large changes in the conditions.

In Fig. 1, the tube or conduit 12 has a fluid flowing therethrough, such as air, a combustible gas, mixtures of gases, etc. which fluid flow is to be controlled by the throttle valve 13. The valve 13 is adjusted by means of a piston 14 reciprocating in a cylinder 15 and connected by suitable means 16 with the throttle valve. A conduit 17 is connected to the conduit 12 downstream of the throttle valve 13, and this conduit 17 is in communication with a pressure responsive device 18. The device 18 is provided with a flexible diaphragm 19 connected to a fluid jet pipe 20 of the well known "Askania" relay type by means of a lever.

Each hydraulic control system is provided with conduits 22 and 23 connected to opposite ends of the cylinder 15 to convey the fluid means controlling the movement or adjustment of the piston 14. In one of the conduits 22 and 23, a modulating valve 24 is inserted in the controlling fluid circuit which will be more fully described as to its functions in the following:

Referring now to the specific structure of the modulating valve shown in Figs. 2 and 3, the cylindrical casing 25 consists of two chambers 26 and 27 each having elbow-pipe sections 28 and 29 respectively connected thereto and communicating with the respective chambers. A partition member 30 is centrally secured in the casing 25 by means of a set screw 31 and consists of a central wall 32 with outer spaced walls 33, the latter each having a plurality of perforations 34 therein consisting of any suitable number and arranged in any desired order and spacing. The walls 32 and 33 are provided with an aligned central bore 35 into which a valve member 36 is slidably mounted and which is in the form of a piston or needle valve having a pair or set of part cone-shaped grooves or variable apertures 37 of varying cross section with the base opening 38 at the outer end of each end of the valve and the pointed end 39 terminating in the central part of the valve adjacent the wall 32 when the valve is in its central or neutral position.

The ends 39 of the grooves or apertures are in spaced but overlapping relationship with each end 39 practically flush with one side of the wall 32 so that, when the valve is in its neutral position, it has a minimum free area for the flow of fluid from one chamber 26 or 27 into the other through the grooves or apertures 37.

Each end of the valve member 36 has a pointed section 40 seating or centered in a seat portion or pin bearing 41 in the inner end of a compression coil spring 42 which, in turn, is supported on an adjustable abutment 43. The latter is mounted on a screw 44 threaded in the end closure 45 and provided with a protecting cap 46 threaded on the screw and also acting as a locking member to maintain the desired compression in the spring 42.

The system shown in Fig. 1 is provided with a throttle valve 47 in conduit 23 and a second variable throttle valve 48 is arranged in a by-pass around the modulating valve 24. The jet-pipe relay is provided with the usual receiving orifice pipes 49.

In the embodiment shown in Fig. 5, the modulating valve is mechanically connected to a well known type of pilot which is mechanically operated in response to changes in a condition. In this instance, the operating fluid under pressure is delivered by a pipe 50 into a chamber 51 and two throttle valves 52 cooperate with the openings in conduits 22 and 53 when the lever 21 adjusts the valves 52 as a unit to uncover one or the other conduit 22 or 53, so that one of said conduits will communicate with the chamber 51. The modulating valve itself consists of a grooved piston valve 54 having part cone-shaped or variable apertures or slots 55 therein shown as converging inwardly toward the center of the valve 54. The conduits 23 and 53 terminate adjacent to the valve 54 and when the valve is in its neutral position it cuts off the flow of fluid through both conduits 23 and 53 and thus prevents the operation of the servo-motor.

In the embodiment shown in Fig. 6, the modulating valve is operated in response to the differential pressure created by the relay system, this differential pressure being, in turn, a function of the change in the condition in line 12. The differential pressure between conduits 22 and 23 is applied to two pressure responsive diaphragms which are held in their neutral position under the influence of springs. Any change in the differential pressure moves the diaphragms and thereby changes the size of the restriction in one of the lines leading to the servo-motor. The modulating valve 24 of Fig. 6 also has a piston valve 54 with the part cone-shaped or variable apertures or slots 55, but it is actuated by bellows diaphragms 56 and opposing springs 57. Fig. 6 shows the parts in neutral position or in which no movement of the throttle valve 13 is taking place, the pressures in conduits 22 and 23 being equal. Any differential pressure, due to changes in pressure in conduit 12, will cause the valve to move proportional to the differential pressure and thus modify the size of the valve restriction or opening.

In the embodiment shown in Fig. 7, the restriction in one of the fluid lines is varied directly in response to the pressure change in line 12, and, at the same time, the relay movement 20 is changed in response to the changes in pressure in line 12. In this instance, the pipe 17 is connected to a pipe 60 which latter is connected to a pressure responsive chamber 61 so that the fluid pressure will act on the diaphragm 62 to actuate the modulating valve 54.

In the embodiment shown in Fig. 8, the restriction is changed as a function of the rate of flows through one of the conduits to the servo-motor. A restriction is provided in the conduit and a differential pressure responsive diaphragm which measures the resistance which the restriction offers to the flow of the controlling medium. The diaphragm, in turn, operates the valve to change the size of the restriction in one of the fluid lines. In this instance, the pipe 23 is provided with a restriction 63 so that a differential pressure will act on both sides of a diaphragm 64, which latter is connected to the modulating valve 54. Equalizing springs 65 will restore the valve 54 to its closed or non-active position.

It is obvious that in the systems disclosed the valves in one of the fluid conduits will modify the pilot characteristics in such a way that any relation between the change of the impulse, that is pilot movement, and the control speed can be obtained and thus the stability of the control is improved.

In the valve and system of Figs. 1 and 2, the oil enters one of the chambers 26 and 27 and, after passing through one of the apertured passages 37, it enters the other chamber in the valve casing. A difference in pressure in pipes 22 and 23 moves the piston 14 and as the pressure differential increases, the valve opens further and thus permits an increased volume of fluid to pass to the servo-motor and increases its speed accordingly. During this operation of the modulating valve 24, the valve member 36 is self-cleaning on each reversal of the piston 14. However, even if the tip ends of the passages 37 should become clogged, the result will be a greater differential pressure across the valve and thus cause the valve to open further.

In the system of Fig. 5, the variable orifice varies as a function of the pilot movement. The throttle valve 54, being attached to the pilot valve 52, the opening of the latter is a function of its displacement which varies the speed of piston 14.

In the system of Fig. 6, a pressure differential in the pipes 49 changes the position of the valve 54 to control the speed of the servo motor.

In the systems of Figs. 7 and 8, a differential pressure in pipes 49 tends to move the piston 14 and, as soon as the piston moves, the modulating valve 54 in one of the oil conduits continues to move until the pressure drop decreases and is equal to the tension of the springs 65.

It is of course obvious that any desired number of apertures or slots 37 may be provided in the valve member 36, which is likewise true of the apertures or slots 55 in the piston valve 54. Also, the apertures or slots 37 and 55 can comprise any length and shape or configuration as for instance a square or rectangular cross section with flat or rounded internal ends instead of pointed ends and converging sides. The partition member 30, which may also be termed a sleeve, may comprise a solid construction having full and complete contacting surfaces with the valve member. The sliding fit of the valve member 36 in the partition member or sleeve 30 may act as a capillary so that instead of pointed end grooves, such apertures 37 may have a side end portion whereby better results may be obtained under certain conditions and requirements wherein the groove or aperture starts abruptly rather than pointed in which the capillary action of the pointed portion is provided by the sliding fit of the piston valve in its sleeve. In such a construction of the piston valve the actual starting or internal end portion of the grooves or apertures which are blunt rather than pointed, will underlap the sleeve and the sliding fit thus performs the function of the pointed ends by capillary action.

It is also obvious that the pointed ends 39 of the grooves 37 may be shortened and made blunt rather than pointed so that the internal end of the grooves underlap the effective edge of the partition 32.

Obviously, the present invention is not restricted to the particular embodiments shown and described. Moreover, it is not indispensable that all the features of this invention be used conjointly, since they may be employed advantageously in various combinations and sub-combinations.

I claim as my invention:

1. A modulating valve for a conduit of hydraulic control systems, comprising a casing, a partition member in said casing dividing said casing into two chambers, said member having a bore therein, and a valve member slidably mounted in said bore and having a plurality of apertures therein of which each aperture increases in size from zero to a maximum, said valve member in its central position in the partition member permitting a minimum flow between the two chambers through the apertures, each aperture in the valve member being part cone-shaped with the apex of the cone adjacent the central part of the valve member and the partition member.

2. A modulating valve for a conduit of hydraulic control systems, comprising a casing, a partition member in said casing dividing said casing into two chambers, said member having a bore therein, a valve member slidably mounted in said bore and having a plurality of apertures therein of which each aperture increases in size from zero to a maximum, said valve member in its central position in the partition member permitting a minimum flow between the two chambers through the apertures, and an adjustable resilient device at each end of the casing and its respective end of the valve member to normally maintain the valve member in its central closed position.

3. A modulating valve for a conduit of hydraulic control systems, comprising a casing, a partition member in said casing dividing said casing into two chambers, said member having a bore therein, a valve member slidably mounted in said bore and having a plurality of apertures therein of which each aperture increases in size from zero to a maximum, said valve member in its central position in the partition member permitting a minimum flow between the two chambers through the apertures, and an adjustable resilient device at each end of the casing and its respective end of the valve member to normally maintain the valve member in its central closed position, each adjustable resilient device including an abutment at the end of the casing and its respective end of the valve member to normally maintain the valve member in its central closed position.

4. A modulating valve according to claim 3, in which a screw member is provided threaded in the casing and contacting the abutment.

5. In a modulating valve for a conduit of hydraulic systems, a valve member having a cylindrical configuration pointed at each end and having a pair of elongated apertures in the peripheral surface of the cylinder, each aperture having its greatest opening adjacent the pointed end and converging to a point toward the central portion of the valve member which provides the minimum opening for the valve member.

6. In a modulating valve for a conduit of hydraulic systems, a valve member having a pointed section at each end thereof and at least two elongated apertures in the peripheral surface thereof, each aperture having its greatest opening adjacent the pointed section and converging to a point toward the central portion of the valve member, said pointed ends of the apertures providing a minimum free area for the valve members.

HERBERT ZIEBOLZ.